(12) United States Patent
Ono et al.

(10) Patent No.: US 12,321,648 B2
(45) Date of Patent: Jun. 3, 2025

(54) IMAGE PROCESSING DEVICE FOR PREVIEWING IMAGE TO BE PRINTED ON 3D OBJECT

(71) Applicant: SEIKO EPSON CORPORATION, Tokyo (JP)

(72) Inventors: Takuya Ono, Nagano (JP); Takahiro Kamada, Nagano (JP); Mitsuhiro Yamashita, Nagano (JP); Yuko Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/479,148

(22) Filed: Oct. 2, 2023

(65) Prior Publication Data

US 2024/0111464 A1   Apr. 4, 2024

(30) Foreign Application Priority Data

Oct. 3, 2022   (JP) .................................. 2022-159539

(51) Int. Cl.
  *G06F 3/12*   (2006.01)
  *G06T 15/04*   (2011.01)
  *G06T 15/50*   (2011.01)
  *G06T 15/80*   (2011.01)

(52) U.S. Cl.
  CPC .......... *G06F 3/1208* (2013.01); *G06F 3/1256* (2013.01); *G06T 15/04* (2013.01); *G06T 15/506* (2013.01); *G06T 15/80* (2013.01)

(58) Field of Classification Search
  CPC ............................. G06F 3/1208; G06F 3/1256
  See application file for complete search history.

(56) References Cited

U.S. PATENT DOCUMENTS

| 11,922,076 B2* | 3/2024 | Tsuchiya ............... G06F 3/1205 |
| 2009/0273819 A1* | 11/2009 | Hanamoto ........... H04N 1/6077 358/500 |
| 2010/0265524 A1 | 10/2010 | Muramatsu |
| 2010/0296111 A1* | 11/2010 | Diegel ................. H04N 1/6052 358/1.9 |
| 2014/0125659 A1* | 5/2014 | Yoshida ............. H04N 1/00442 345/589 |
| 2015/0062602 A1* | 3/2015 | Ono ...................... G06F 3/1256 358/1.9 |

(Continued)

FOREIGN PATENT DOCUMENTS

| JP | 2009-272705 A | 11/2009 |
| JP | 2010-252037 A | 11/2010 |

(Continued)

*Primary Examiner* — Benjamin O Dulaney
(74) *Attorney, Agent, or Firm* — Global IP Counselors, LLP

(57) ABSTRACT

An image processing device converts image data, which is data of an image expressed in a first color space, into an expression in a second color space used in rendering by using a color conversion profile prepared in advance, generates a converted image data, and generates a rendering image corresponding to the appearance of the printed-on print medium in a virtual space by performing physical based rendering of the printed-on print medium on which the image has been printed, using the converted image date and parameters necessary for performing physical based rendering of the print medium as a 3D object.

14 Claims, 10 Drawing Sheets

(56) References Cited

U.S. PATENT DOCUMENTS

| | | | |
|---|---|---|---|
| 2015/0062654 A1* | 3/2015 | Ono | B41J 2/2117 358/2.1 |
| 2015/0283825 A1* | 10/2015 | Takai | G06F 3/1256 347/9 |
| 2015/0375496 A1* | 12/2015 | Taki | B65B 11/004 101/35 |
| 2016/0274830 A1* | 9/2016 | Jang | G06F 3/1256 |
| 2016/0309060 A1* | 10/2016 | Fukuda | G06K 15/102 |
| 2017/0099410 A1* | 4/2017 | Iguchi | H04N 1/32229 |
| 2017/0265515 A1* | 9/2017 | Davila | A23P 20/20 |
| 2017/0374234 A1* | 12/2017 | Leskanic | H04N 1/6052 |
| 2018/0033193 A1* | 2/2018 | Goel | G06T 15/04 |
| 2018/0033194 A1* | 2/2018 | Goel | G06V 20/653 |
| 2018/0150270 A1* | 5/2018 | Harayama | G06F 3/1205 |
| 2020/0041261 A1* | 2/2020 | Bernstein | A61B 34/20 |
| 2021/0158600 A1* | 5/2021 | Bosneaga | G06V 30/142 |
| 2021/0160390 A1* | 5/2021 | Sakai | B41J 3/46 |
| 2021/0362424 A1* | 11/2021 | Tastl | G06F 30/20 |

FOREIGN PATENT DOCUMENTS

| | | | |
|---|---|---|---|
| JP | 2012-161080 A | 8/2012 | |
| JP | 2014-095965 A | 5/2014 | |

\* cited by examiner

IMAGE PROCESSING DEVICE FOR PREVIEWING IMAGE TO BE PRINTED ON 3D OBJECT

The present application is based on, and claims priority from JP Application Serial Number 2022-159539, filed Oct. 3, 2022, the disclosure of which is hereby incorporated by reference herein in its entirety.

BACKGROUND

1. Technical Field

The present disclosure relates to image processing techniques that may display how a print medium appears.

2. Related Art

It is conventional to display a preview of a print medium prior to printing using a printer or press. In order to make the preview of the print medium approximate the appearance of the actual print medium, it is necessary to increase the reproducibility of the print medium in consideration of various conditions such as the color of the light source. For example, JP-A-2010-252037 proposes an image processing method in which a plurality of device link profiles (to be referred to as DLP hereinafter) corresponding to actual combinations are prepared in advance in consideration of a color space information of input device, environmental light, color conversion method, and the like, and an appropriate DLP is selected in accordance with a matching mode to perform a color matching process, thereby increasing color reproducibility of a print medium while shortening the processing time.

However, although JP-A-2010-252037 improved color reproducibility itself, it is insufficient in terms of reproducing how the print medium appears based on an image data. For example, the appearance of the print medium varies depending on various factors such as the position and angle of the light source when viewing the print medium, the distance to the print medium, the angle of the line of sight to the surface of the print medium, and the state of the surface such as the gloss of the print medium itself. In consideration of such points, it cannot be said that sufficient consideration has been given to the reproducibility of the print medium in the conventional image processing technique.

SUMMARY

A first aspect of the present disclosure is in the aspect of an image processing device that generates a rendering image of a print medium on which an image is printed.

This image processing device includes an image data acquisition section configured to acquire image data in which the image is expressed in a first color space; a color conversion section that uses a color conversion profile prepared in advance to convert the image data into an expression in a second color space used during rendering and to generate converted image data; a parameter acquisition section configured to acquire parameters necessary for performing physical based rendering the print medium to be printed the image as a three dimensional (hereinafter referred to as 3D) object; and a rendering execution section that uses the converted image data and the parameters to perform physical based rendering of a printed-on print medium printed with the image and to generate a rendering image corresponding to an appearance, in a virtual space, of the printed-on print medium.

A second aspect of the present disclosure is a configuration as a non-transitory computer-readable storage medium storing an image processing program.

A non-transitory computer-readable storage medium storing an image processing program implemented by a computer to generate a rendering image of a print medium on which an image is printed, the program includes a first function of using a color conversion profile prepared in advance to convert image data, which is data of an image expressed in a first color space, into an expression in a second color space used during rendering and generating a converted image data and a second function of using the converted image data and parameters necessary for performing physical based rendering of the print medium on which the image is to be printed as a 3D object, to perform physical based rendering of the printed-on print medium printed with the image to generate a rendering image corresponding to an appearance, in the virtual space, of the printed-on print medium.

DESCRIPTION OF EMBODIMENTS

A. First Embodiment (A1) Hardware Configuration

Figure 1:
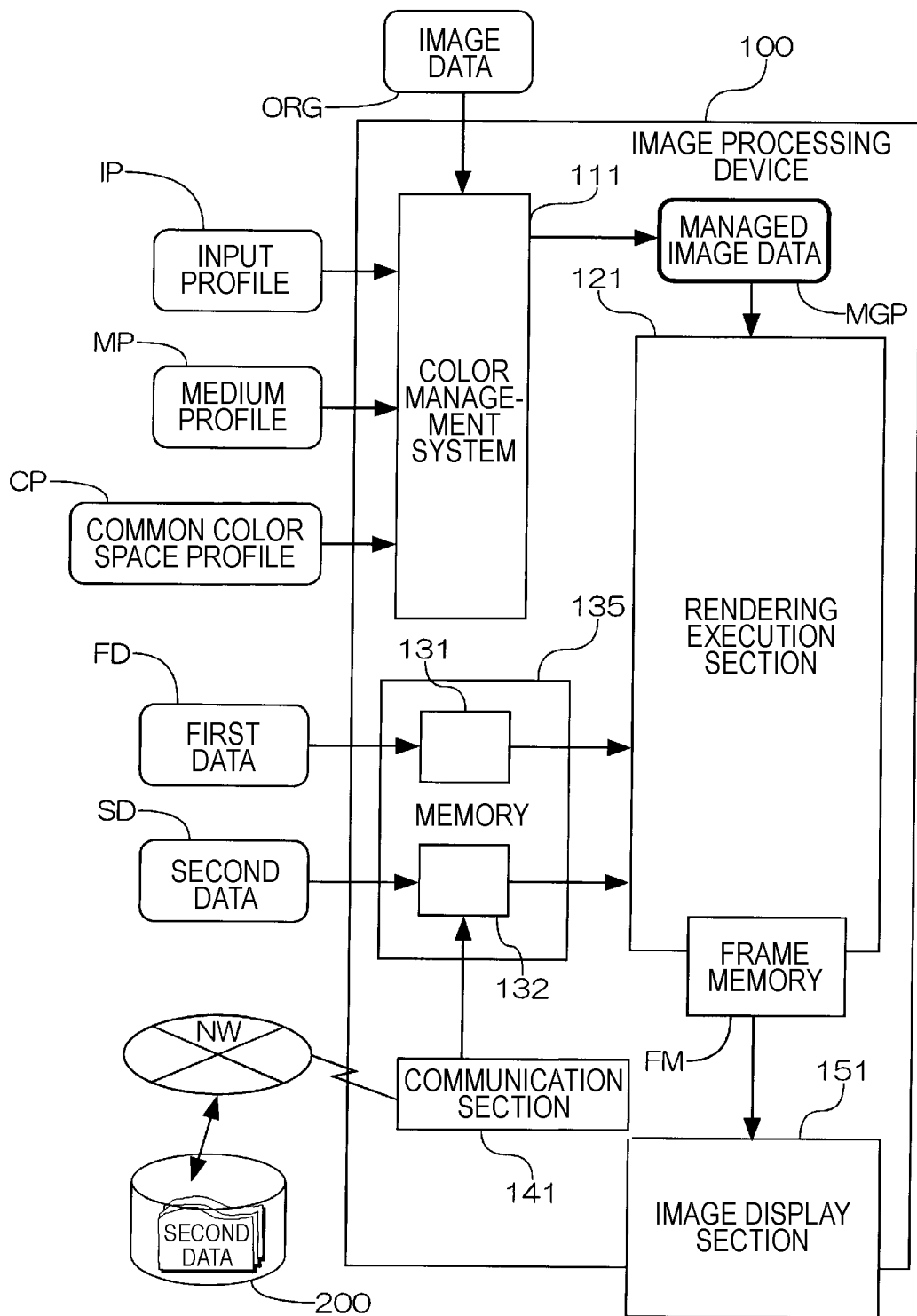
FIG. 1 is a schematic configuration diagram showing an image processing device according to an embodiment.

FIG. 1 shows a schematic configuration of an image processing device 100 of the present embodiment. The image processing device 100 performs image processing for previewing an image printed on a predetermined print medium. The image processing device 100 not only performs image processing, but also displays the processing result as a preview image. As shown in FIG. 1, the image processing device 100 includes a color management system 111 that mainly performs color conversion, a rendering execution section 121 that executes rendering of a print medium, a memory 135 including a first storage section 131 and a second storage section 132, a communication section 141 that exchanges data with a site 200 of external via a network NW such as the Internet, and an image display section 151 that displays the preview image. Note that a program for performing each process (to be described later) is stored in the memory 135 or the like of the image processing device 100, and each function of the image processing device 100 is realized by a CPU or a GPU executing the program stored in the memory.

The color management system may hereinafter be abbreviated as CMS for brevity. The CMS 111 can acquire image data ORG representing an image to be printed (hereinafter referred to as an original image). The image data ORG may be received via wired or wireless communication from an image forming device that generated the image data ORG, or may be read from a memory card that stores the image data ORG in a file format. Of course, the data may be acquired via a network. Alternatively, the image data ORG may be generated in this image processing device 100. When the image data ORG is generated in the image processing device 100, the image data ORG may be output to an external printing device by communication or the like when printing.

The CMS 111 performs color conversion on the original image, which is to be the target of print preview, into an object color to be expressed on the print medium. The converted image data is referred to as managed image data MGP. Details of the CMS process will be described later. The managed image data MGP is set as a texture of the print medium, which is a 3D object. Input profile IP, medium profile MP, common color space profile CP, and the like are input to the CMS 111. The input profile IP is used to perform conversion from a device-dependent color system on the input side such as RGB data to a device-independent color system such as L*a*b* (hereinafter, simply referred to as Lab). The medium profile MP is a profile representing color reproducibility when a specific printing device such as a printer prints on specific print medium under printing conditions such as a specific printing resolution, and is a profile for converting a color value between the device-independent color system and the device-dependent color system. The medium profile MP includes information other than the print medium, such as print settings of the printing device. For this reason, if all combinations of printing devices (printers)×print medium×print settings are to be covered, the number of types of medium profiles MP increases. Therefore, in a case where the dependency of the printing conditions is small or in a case where it is not desired to increase the number of profiles, the medium profiles MP are configured as a combination of printing devices (printers)×print medium. In this way, since the characteristics of the printing device and the characteristics of the print medium itself are involved in the color of the image on the print medium (medium), the medium profile MP may be referred to as a printing profile MP below.

When the input profile IP is applied to the image data ORG and the printing profile MP is further applied, the color value is obtained for a case where printing is performed under specific printing conditions, that is, for a case depending on the printing device or the print medium. When the printing profile MP is applied to convert the color value of this image from the device-dependent color system to the device-independent color system, and the common color space profile CP is further applied, the color value is converted into an expression in the second color space (here, the sRGB color space) used for rendering. Since the color value is once converted into the color value depending on the characteristics of the printing device, the print medium, and the like by using the printing profile MP, the image data ORG is color conversion into a range of the color value that can be actually printed. The common color space profile CP is used to convert the image data into the color value of the color space used in rendering. Although the sRGB color space is representative as the common color space, AdobeRGB, Display-P3, or the like may be used.

As described above, the CMS 111 uses each profile to convert the image data ORG expressed in the first color space, which is a device-dependent color system, into the image data MGP (managed image data) expressed in the sRGB color space, which is a second color space used in rendering. Here, the converted image data is not limited to the color value of the sRGB color space, and may be expressed in any color space as long as it is expressed in a color space that can be handled by the rendering execution section 121. For example, when the rendering execution section 121 adopts a configuration capable of rendering based on the color value in the Lab or XYZ color space, spectral reflectance, or the like, the image data may be converted into color values to be used for display on the image display section 151 in a lighting process (to be described later) performed in the rendering execution section 121 or in a post processing section (to be described later) disposed after the rendering execution section 121.

The memory 135 captures and stores first data FD in the first storage section 131, and captures and stores second data SD in the second storage section 132. The first data FD and the second data SD are parameters necessary for physical based rendering and displaying the print medium on which the image is to be printed as the 3D object. In particular, the first data FD is data related to the shape of the print medium under the light source in a virtual space, and includes 3D object information of the print medium, camera information such as a position of viewing the print medium, lighting information such as position and color of lighting, background information indicating information of a background on which the print medium is placed, and the like. The second data SD is data related to image formation on a surface of the print medium, and includes, for example, data representing the texture and the like of the surface of the print medium and the like. The first data FD and the second data SD are used at the time of rendering in the rendering execution section 121.

For the first data FD and the second data SD, representative data having a use frequency equal to or higher than a predetermined value may be stored in advance in a non-volatile manner in the first storage section 131 and the second storage section 132, selected as necessary, and may be referred to by the rendering execution section 121. Texture data or the like in the case of using a print medium which is not normally used due to a low use frequency or the like, for example, a special material such as a fabric material, a can, or a plastic sheet may be stored in the site 200 of external and may be acquired via the communication section 141 when necessary. The first data FD such as the lighting information may be designated individually by the user at the time of rendering, or a representative camera angle and a light source may be stored in the first storage section 131 in advance and used. The camera angle refers to a position and a direction in which the user is looking at the print medium as an object, and corresponds to a position of a virtual viewpoint and a direction of a virtual line of sight of the user looking at the virtual space. For this reason, the camera may sometimes be described as a "viewpoint" or a "view" as the viewpoint or the direction of the line of sight.

The image display section 151 displays the image of the print medium rendered by the rendering execution section 121 together with the background and the like. The image display section 151 reads out the image data for display from a frame memory FM provided in the rendering execution section 121, and displays the image data. The image display section 151 may be provided in the image processing device 100, or may be provided separately from the image processing device 100. Note that the image processing device 100 may be realized as a dedicated machine, or may be realized by causing a computer to execute an application program. Of course, the computer includes a terminal such as a tablet or a mobile phone. Since the process of the rendering execution section 121 requires considerable resources and computing power, the image processing device 100 may be configured such that only the rendering execution section 121 is executed by a CPU capable of high-speed process or a dedicated GPU, and the rendering execution section 121 is positioned at another site on the network.

The color conversion process performed by the CMS 111 will be described with reference to FIG. 2A. The figure is a flowchart showing a process of converting the original image data ORG into a color data of a common color space for rendering by the CMS 111. When the color conversion process is started, the original image data ORG and the input profile IP are input, and the original image data ORG represented by the device-dependent color system (for example, the RGB color system) is converted into color data of the device-independent color system (for example, the Lab or XYZ color system) (step S110). Next, it is determined whether or not a medium profile MP is prepared (step S120), and if there is a medium profile MP, this is applied, and color conversion into a range of colors expressible by printing is performed in consideration of a combination of printing devices (printers)×print medium as the printing conditions (step S130). If there is no medium profile MP, the process of step 5130 is not performed. Then, using the common color space profile CP, it is converted into color value in the common color space, which is the second color space used for rendering (step S150). In the present embodiment, sRGB is used as the common color space. The managed image data MGP thus obtained is set to the albedo color, which is the texture of the 3D object (step S160), and this process routine ends.

In step S130, if the rendering intent of the color conversion of the medium profile is set to absolute, the color (ground color) of the print medium itself can be reflected. When the color value of the image to be subjected to the color conversion in step S150 is out of a gamut of the sRGB color space, the color value may be approximated to a value in the sRGB color space, or may be treated so as to take a value out of the gamut of the sRGB color space. The RGB values of the image data are generally stored as 8 bits for each color, that is, integers of values 0 to 255, but instead of this, if the pixel values are represented as floating points of values 0.0 to 1.0, values outside the color gamut of sRGB can be handled as negative values or values exceeding 1.0.

Figure 2A:
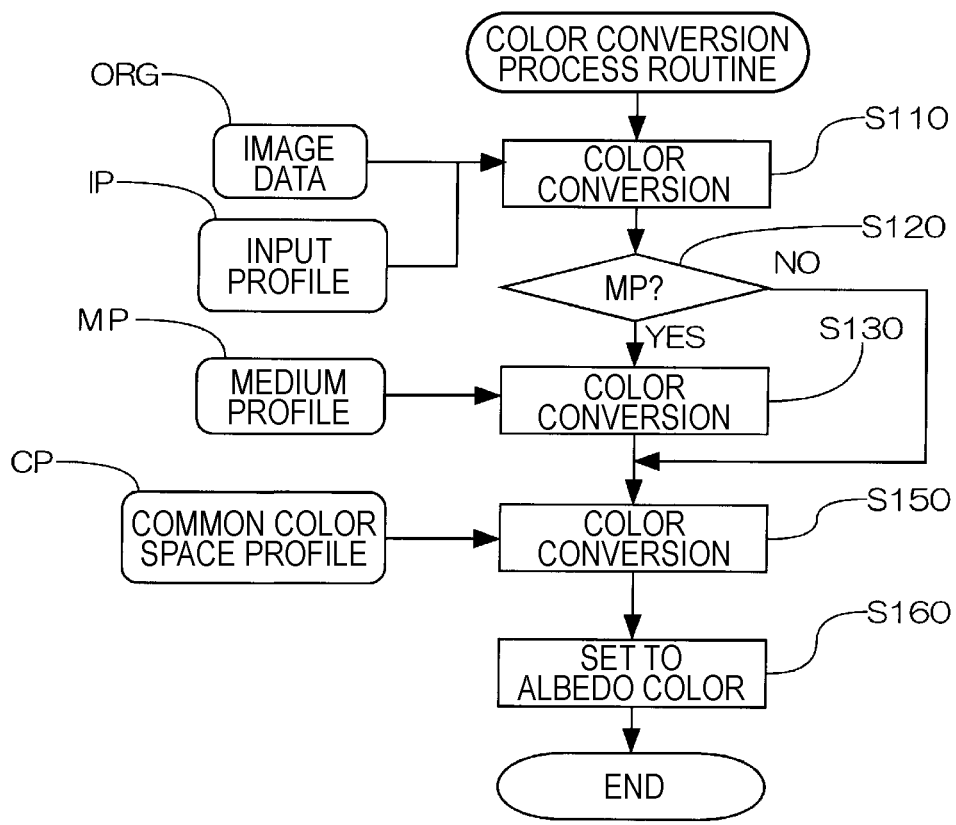
FIG. 2A is a flowchart showing an outline of a color conversion process.
Figure 2B:
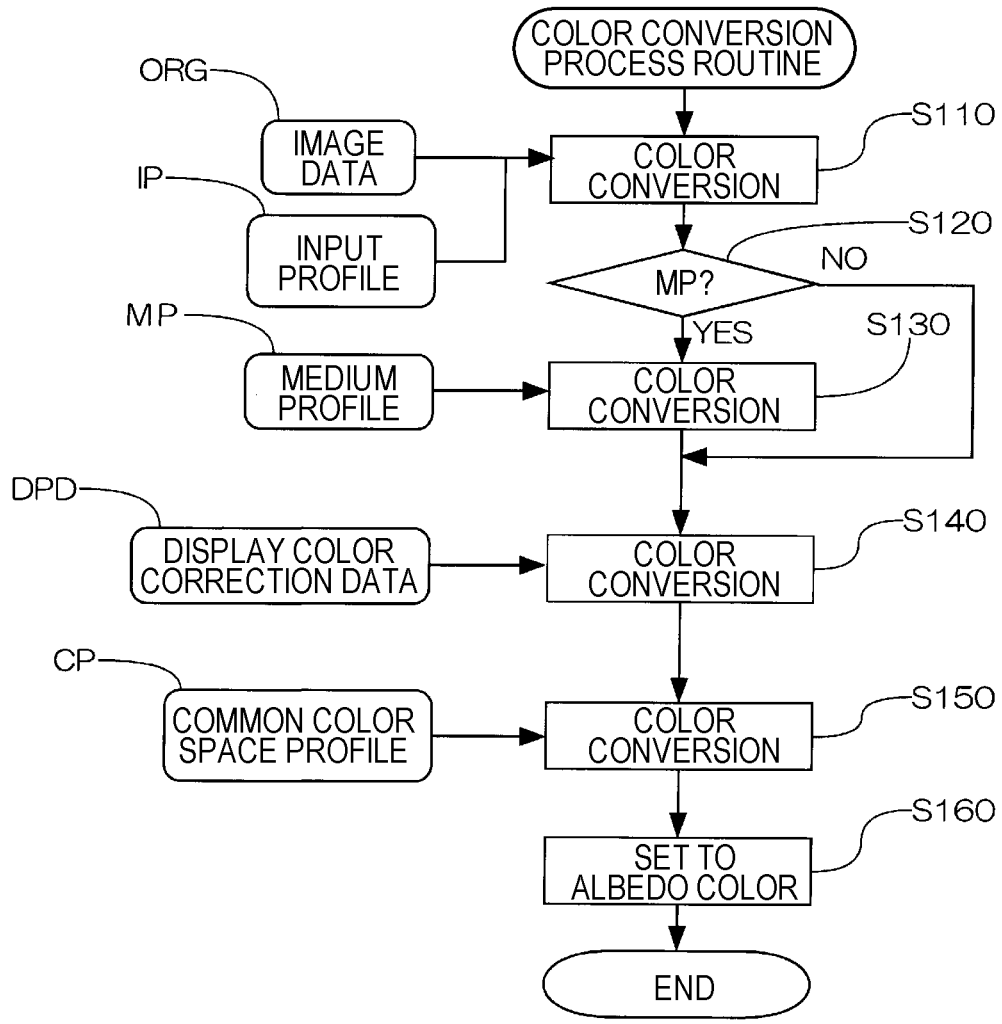
FIG. 2B is a flowchart showing another configuration example of the color conversion process.
Figure 2C:
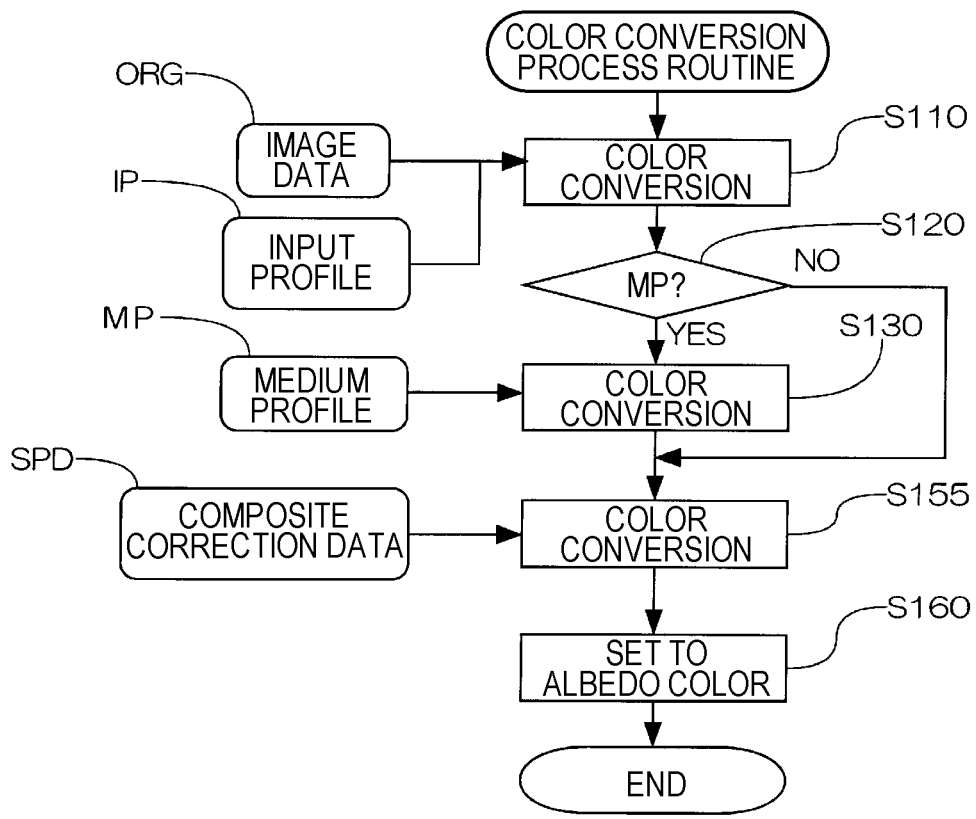
FIG. 2C is a flowchart showing another configuration example of the color conversion process.

The color conversion by CMS 111 is not limited to the configuration shown in FIG. 2A, and may be performed by, for example, the configuration shown in FIG. 2B or FIG. 2C. FIG. 2B shows a color conversion process routine in the case where correction data DPD for the image display section 151 is prepared. Display device correction data DPD is data for correcting the deviation of display color of the image display section 151 with respect to sRGB, which is the common color space. In the color conversion process shown in FIG. 2B, after the color conversion (step S130) using the medium profile MP, the color conversion process (step S140) is performed using the display device correction data DPD.

The composite correction data SPD may be prepared by composing such display device correction data DPD and the common color space profile CP in advance, and the color conversion by the composite correction data SPD (step S155) may be performed instead of the color conversion by the common color space profile CP (step S150). An example of the color conversion process in this case is shown in FIG. 2C. Note that a correction for a shift in the display color of the image display section 151 may be performed by a post processing section PST after a render backend shown in FIG. 3 (to be described later), instead of being performed by the CMS 111.

Figure 3:
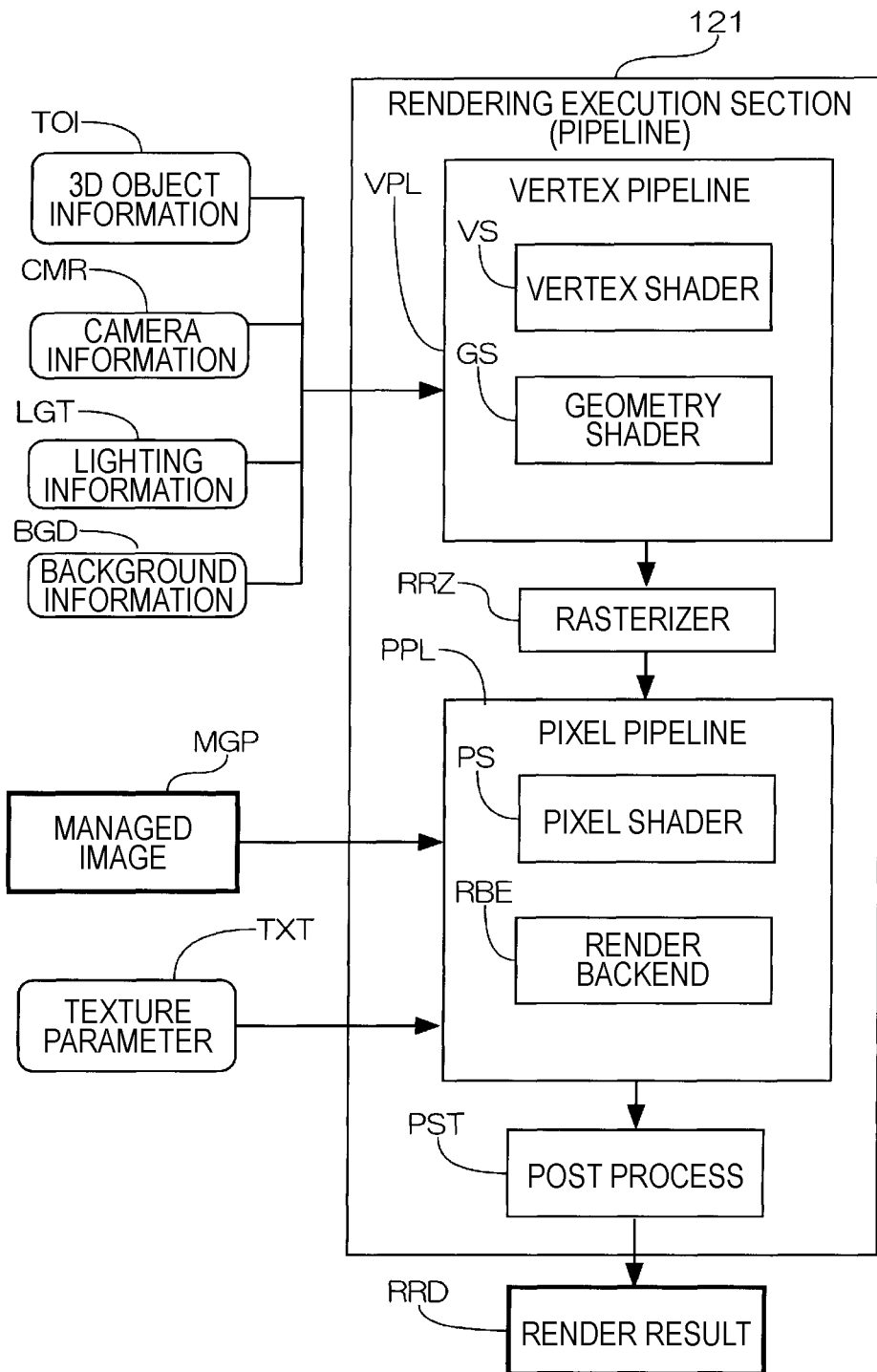
FIG. 3 is an explanatory diagram showing a logic configuration of the rendering execution section of the embodiment.

The rendering execution section 121 renders the managed image data MGP output by the CMS 111 after color conversion, so that the image display section 151 displays how the print medium on which the original image data ORG is printed appears in the virtual space. FIG. 3 shows a configuration example of the rendering execution section 121. This rendering execution section 121 shows a typical configuration for performing a physical based rendering process, and other configurations can be adopted. The rendering execution section 121 of the present embodiment adopts a pipeline configuration including a vertex pipeline VPL and a pixel pipeline PPL, and executes physical based rendering at high speed. The vertex pipeline VPL includes a vertex shader VS and a geometry shader GS. It should be noted that a configuration not using the geometry shader GS is also possible.

The vertex shader VS converts the coordinates on the print medium of the vertex of the print medium, which is a 3D object, into the coordinates of the 3D space to be rendered. Comprehensively, the coordinate conversion includes coordinate conversion such as coordinates of a model (here, the print medium) to be rendered→world coordinates→view (camera) coordinates→clip coordinates, but conversion to view coordinates and the like is performed by the geometry shader GS. In addition, the vertex shader VS also performs shading, calculation of texture coordinates (UV), and the like. In these processes, the vertex shader VS and the geometry shader GS refer to 3D object information TOI, camera information CMR, lighting information LGT, background information BGD, and the like stored in the first storage section 131.

The 3D object information TOI is information relating to the shape and the like of the print medium as the 3D object. Since the actual print medium is not a flat surface, it is basically treated as a set of minute polygons, but when the surface of the print medium is expressed by minute polygons, the number of polygons becomes enormous. Therefore, it is also realistic to handle the surface of the print medium by texture such as a normal line map or a height map. The texture such as a normal line map and a height map are given as texture parameters (to be described later). The camera information CMR is a virtual information indicating in which position and direction the camera is installed with respect to the print medium. The lighting information LGT includes at least one of the virtual information such as position, angle, strength, and color temperature of the light source in the virtual space in which the print medium is placed. Note that a plurality of light sources can be set, and in this case, the influences of the plurality of light sources may be separately calculated and overlapped on the 3D object.

The background information BGD may be omitted, but is information relating to the background on which the print medium is placed as a 3D object in the virtual space. The background information BGD includes information of object such as a wall, a floor, and a furniture disposed in the virtual space, and these objects are targets of rendering by the rendering execution section 121, similarly to the print medium. Since the lighting lights the print medium by lighting these background objects, it is also treated as part of the information about lighting. By performing rendering using such various kinds of information, a three dimensional preview becomes possible. The vertex information calculated by the vertex shader VS is passed to the geometry shader GS.

The geometry shader GS is used to process a set of vertex in the object. By the geometry shader GS, it is possible to increase or decrease the number of vertices at the time of execution and to change the type of primitive constituting the 3D object. An example of increasing or decreasing the number of vertices is a culling process. In the culling process, vertices that do not appear on the camera are excluded from the processing target from the position and the direction of the camera. The geometry shader GS also performs a process such as generating a new primitive from existing primitives such as points, lines, and triangles. From the vertex shader VS, the geometry shader GS inputs the primitive having information of the entire primitive or a neighboring primitive. The geometry shader GS processes the input primitive and outputs the primitive to be rasterized.

The output of the vertex pipeline VPL, specifically, the primitive processed by the geometry shader GS, is rasterized by the rasterizer RRZ, generated in pixel units of data, and passed to the pixel pipeline PPL. The pixel pipeline PPL includes in the present embodiment a pixel shader PS and a render backend RBE.

The pixel shader PS manipulates the rasterized pixels and, in short, calculates the color for each pixel. Based on the information input from the vertex shader VS and the geometry shader GS, the process of synthesizing the texture and the process of applying a surface color are performed. The pixel shader PS maps the managed image data MGP, which is obtained by converting the image data ORG by CMS 111 based on the various profiles, on the print medium as the 3D object. At this time, the lighting process function provided in the pixel shader PS performs a lighting process based on the light reflection model of the object, the lighting information LGT described above, and a texture parameter TXT, which is one of the second data SD stored in the second storage section 132, and performs mapping of the managed image data MGP. The reflection model used in the lighting process is one of arithmetic equations of a mathematical model for simulating a lighting phenomenon in the real world. The reflection model used in the present embodiment will be described in detail later.

In the process of manipulating pixels, when the number of pixels after rasterization increases, for example, when the output resolution is high, a high load is imposed, and the process takes time. Therefore, as compared with a process in vertex units, the process takes time and the efficiency of the pipeline process may be insufficient. In the present embodiment, the processing program of the pixel shader PS is optimized for execution by a GPU having high parallel processing performance, thereby realizing advanced effects including expression of texture in a short time.

It is determined by the render backend RBE as to whether or not the pixel information obtained by the process of the pixel shader PS is to be further rendered in the display frame memory FM. The pixel data is stored as having been rendered, only when the render backend RBE determines that the pixel data may be written into the frame memory FM without problems. As a test used for the rendering determination, there are known "alpha test", "depth test", "stencil test", and the like. The render backend RBE executes the set test among such tests and writes pixel data into the frame memory FM.

The rendering pipeline process is completed by the above process, and then the post processing section PST performs process for improving the appearance on the data stored in the frame memory FM. Such a process includes, for example, an anti-aliasing process for smoothing an image by removing unnecessary edges of the image and the like. In addition, there are processes such as ambient occlusion, screen space reflection, and depth of field, and the post processing section PST may be configured to perform necessary post process.

Figure 4:
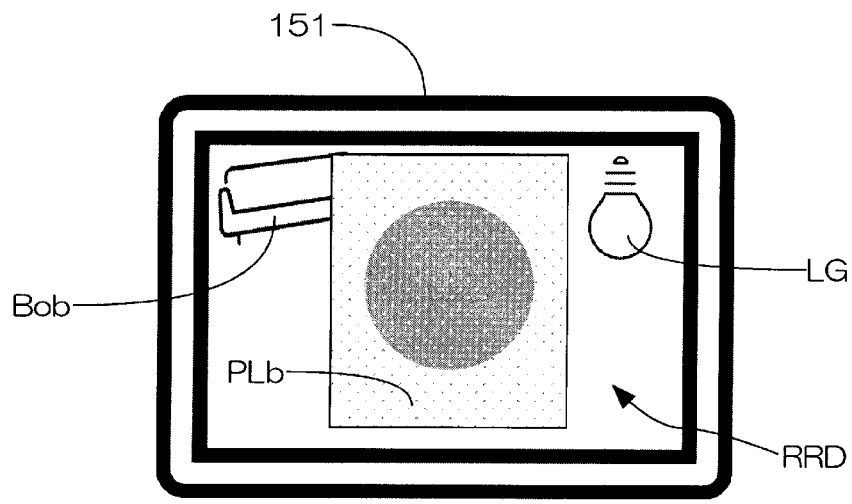
FIG. 4 is an explanatory diagram schematically showing a display example of a print medium on which an image is printed.

When the rendering execution section 121 performs the above processes, rendering is completed, and the result is output as a render result RRD. In practice, the data written in the frame memory FM is read in accordance with the display cycle of the image display section 151, and is displayed as the rendering result RRD. An example of the render result RRD is exemplified in FIG. 4. In this example, a print medium PLb as a 3D object, a light source LG, and a background object Bob, such as piece of furniture existing as one of backgrounds, are placed in the virtual space and displayed on the image display section 151.

Figure 5:
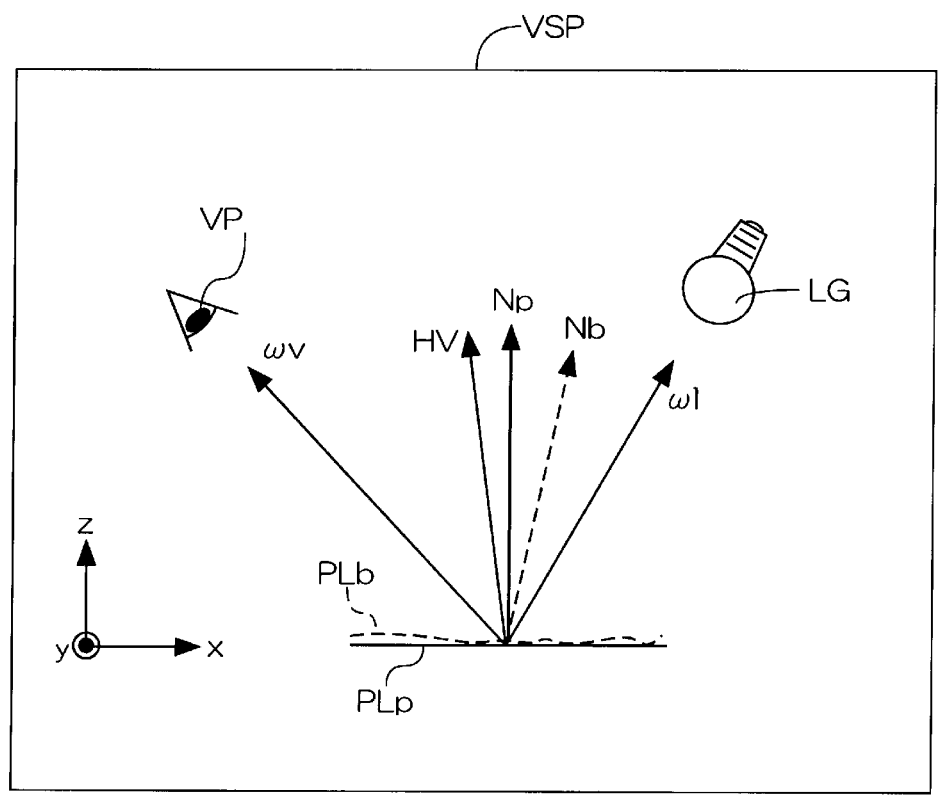
FIG. 5 is an explanatory diagram showing the relationship between a light source or viewpoint and angle of the plane of the 3D object.

The relationship between the print medium PLb placed in the virtual space and the light source LG or the viewpoint (camera) VP is exemplified in FIG. 5, exemplify. Although the relationship between the light source LG or the viewpoint VP and the print medium PLb is three dimension in the virtual space VSP, the figure shows the virtual space VSP on an x-z plane. x is a coordinate of a point at which vectors described below are gathered. With respect to a predetermined coordinate x of the print medium PLb, which is the target of rendering, a positional relationship between the light source LG which irradiates this with light and the viewpoint VP is exemplified. In the figure are shown a light source direction vector $\omega l$ from the coordinate x toward the light source LG, a viewpoint direction vector $\omega v$ from the coordinate x toward the viewpoint VP, and a half vector HV of both. A reference symbol Np indicates a normal line vector in a case where the print medium PLb is assumed to be a perfect plane PLp, and a reference symbol Nb indicates a normal line vector at the coordinate x of the actual print medium PLb, which is not a perfect plane. Note that FIG. 4 exemplifies the rendering result of the print medium PLb on the assumption that the viewpoint VP (camera) exists substantially in front of the print medium PLb.

Figure 6:
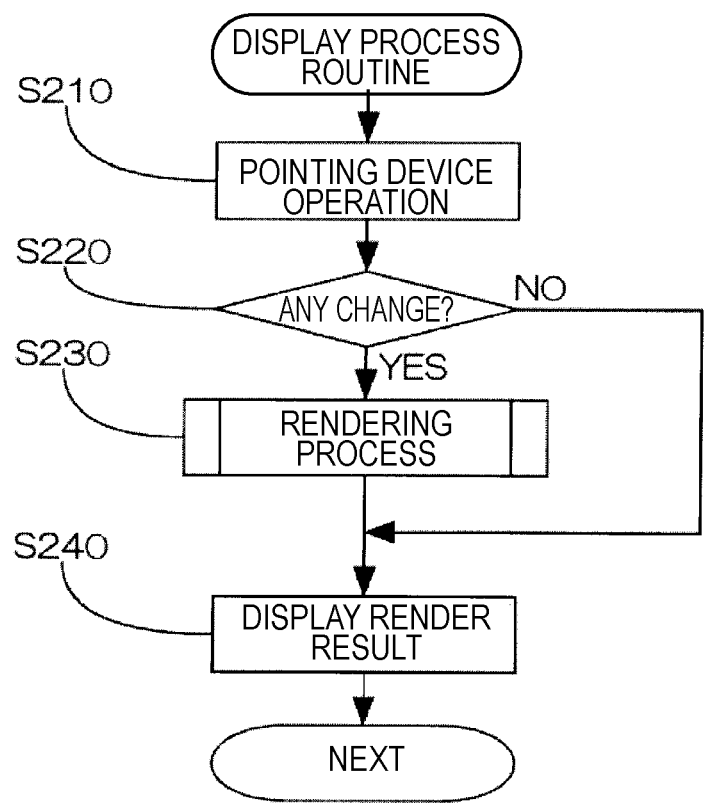
FIG. 6 is a flowchart showing a display process routine.

In the image processing device 100 of the present embodiment, the position and angle of the print medium in the virtual space can be freely changed, and the appearance can be confirmed together with the image on the print medium. This is because, as shown in FIG. 6, a pointing device is operated with respect to the image displayed on the image display section 151 (step S210), and if there is a change in an instruction by the pointing device (step S220:"YES"), and the image processing device 100 repeats a series of process in which the rendering process by the rendering execution section 121 is performed again (step S230), and the processing result is displayed on the image display section 151 (step S240). Here, the pointing device may be a 3D mouse, a tracking ball, or the like, or may be of a type in which a multi-touch panel provided on the image display section 151 is operated with a finger or a touch pen. For example, when a multi-touch panel is provided on the surface of the image display section 151, the print medium PLb or the light source LG may be directly moved by a finger or the like, or the print medium PLb may be rotated or the distance between the light source LG and the print medium PLb may be three dimensionally changed by using two fingers.

Figure 7:
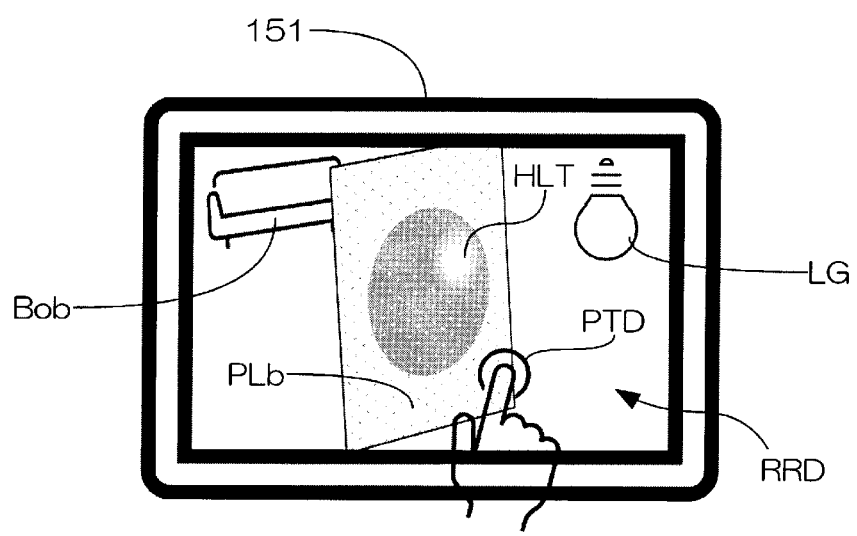
FIG. 7 is an explanatory diagram schematically showing a state in which the display of the print medium changes due to a change in an angle of a surface of the print medium on which the image is formed with respect to the light source.
Figure 8:
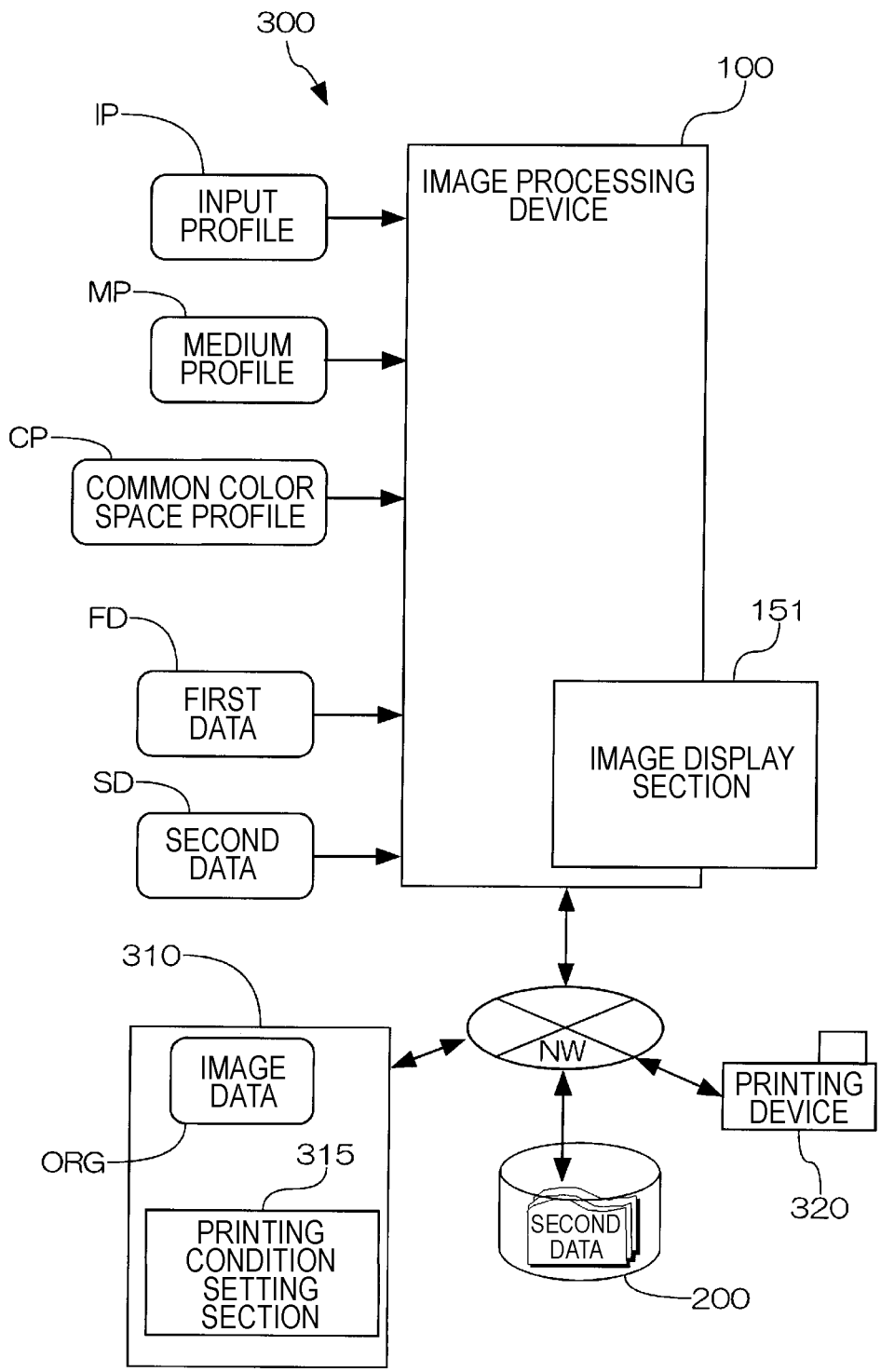
FIG. 8 is a schematic configuration diagram showing an embodiment as a printing system.

The rendering execution section 121 performs the rendering process each time the position, the angle, or the like of the print medium PLb or the light source LG in such a virtual space is changed and displays the rendering result RRD on the image display section 151. An example of such a display is shown in FIG. 7. As shown in the figure, when the position, the angle, and the like of the print medium PLb and the light source LG in the virtual space are changed, the print medium on which the image is printed is subjected to physical based rendering each time, and the actual print medium on which the image is printed is displayed in a state close to a state in which the print medium can be seen in the real space.

In particular, in the present embodiment, in addition to the conversion by the color management system (CMS) of the color of the image to be printed on the print medium into the color of the image to be actually printed, with respect to the lighting process at the time of rendering, because

[1] the print medium on which the image is to be printed is handled as a 3D object and

[2] the texture of the surface of the print medium is taken into consideration using the texture parameters TXT, the reproducibility of the print medium displayed on the image display section 151 is extremely high. Hereinafter, the processes [1] and [2] will be described.

About [1]

How the 3D object appears in the virtual space can be represented by using a bidirectional reflectance distribution function (BRDF) and the luminance of the reflection light, at each section of the object. The bidirectional reflectance distribution function BRDF indicates an angular distribution characteristic of reflected light when light is incident from a specific angle. The luminance is the brightness of the object. Both are also collectively referred to as an lighting model. An example of the reflection model adopted in the present embodiment is shown below. The BRDF can be represented as a function f (x, ωl, ωv) and the luminance as a function L (x,ωv) by following equations (1) and (2), respectively.

$$f(x,\omega l,\omega v)=kD/\pi+kS*(F*D*V) \quad (1)$$

$$L(x,\omega v)=f(x,\omega l,\omega v)*E\perp(x)*n\cdot\omega l \quad (2)$$

wherein x indicates in-plane coordinates,
ωv indicates viewpoint direction vector,
ωl indicates light source direction vector,
kD indicates diffuse albedo,
kS indicates specular albedo,
F indicates fresnel term,
D indicates normal line distribution function,
v indicates geometric damping term,
E⊥(x) indicates illuminance perpendicular incident on coordinate x, and
n indicates normal line vector.

The first term of the BRDF, kD/π, is a diffuse reflection component and is a Lambertian model. The second term is a specular reflection component and is the Cook-Torrance model. In equation (1), kd/π may be referred to as a diffuse reflection term, and kS*(F*D*V) may be referred to as a specular reflection term. Models and calculation methods of a Fresnel term F, a normal line distribution function D, and a geometric damping term V are known, and thus description thereof will be omitted. As the BRDF, a function corresponding to a reflection characteristics of a surface of the 3D object or a purpose of rendering may be used. For example, a disney principled BRDF may be used. In the present embodiment, the BRDF is used as a function representing the reflection of light, but a bidirectional scattering surface reflectance distribution function BSSRDF may be used as a function representing the reflection of light.

As can be seen from the equations (1) and (2), the normal line vector n, the light source direction vector ωl, and the viewpoint direction vector ωv are necessary for the calculation of the reflection model. The print medium is handled as a 3D object composed of a plurality of minute polygons as the target of the rendering process, and the normal line vector n reflecting minute irregularities on the surface of the print medium are calculated from the normal line Np of the polygons and the normal line map (to be described later). Therefore, in the vertex pipeline VPL, the normal line Np of the polygons and the UV coordinates for determining the reference position of the normal line map are calculated and input to the pixel pipeline PPL together with the light source direction vector ωl and the viewpoint direction vector ωv. In the pixel pipeline PPL, the pixel shader PS refers to the normal line map given as one of the texture parameters by using the UV coordinates, and calculates the normal line vector n from the value of the referred normal line map and the normal line Np of the polygons.

In the present embodiment, as described above, print medium on which the image is to be printed is handled as a 3D object, and physical based rendering is performed using the equations (1) and (2). As shown in FIG. 7, the light source direction vector ωl and the viewpoint direction vector ωv are calculated each time the user changes the position and the angle of the print medium PLb and the light source LG in the virtual space using the pointing device.

About [2]

In the present embodiment, the texture of the surface of the print medium is considered using the texture parameters TXT. As the texture parameters TXT, there are the following parameters, but it is not necessary to consider all of them, and at least one of the following parameters, for example, smoothness may be considered.

Smoothness S or Roughness R

Smoothness S is a parameter indicating the smoothness of the surface of the 3D objects. The smoothness S is generally specified in the range of values 0.0 to 1.0. The smoothness S has an influence on the normal line distribution function D and the geometric damping term V in the equation (1) of BRDF described above. When this value is large, the specular reflection becomes strong, and a glossy feeling is exhibited. Roughness R may be used instead of the smoothness S. Both can be converted as S=1.0−R.

Metallic M

Metallic M indicates the extent to which the surfaces of the 3D object are metallic. If the surface is highly metallic, the value of metallic M will be large. If the metallic M is large, the surface of the object is likely to reflect light from the surroundings, resulting in reflection that reflects the surrounding scenery, and the color of the object itself is likely to be hidden. Metallic M influences the Fresnel term F.

The Fresnel term F can be represented by the following equation (3) by using the Schlick approximation.

$$F(\omega l, h) = F_0 + (1-F_0)(1-\omega l \cdot h)^5 \qquad (3)$$

Wherein h indicates a half vector of the viewpoint direction vector ωv and the light source direction vector ωl and $F_0$ indicates a specular reflectance at the time of perpendicular incidence.

The specular reflectance $F_0$ may be directly designated as a color of a specular reflection light (specularColor), or may be given by equation (4) of linear interpolation (herein, denoted as a lerp function) using metallic M.

$$F_0 = \text{lerp}(0.04, tC, M) \qquad (4)$$

wherein tC is the color (albedoColor) of the texture of the 3D object.

Note that the value 0.04 in the equation (4) is a representative value of each of RGB indicating a general value of a non metal. The same applies to the color tC of the texture.

Normal Line Map

The normal line vectors of the minute irregularities on the surface of the print medium are represented in the normal line map. By associating (attaching) the normal line map to the 3D object, it is possible to apply normal line vectors of the minute irregularities of the surface of the print medium to the 3D object. The normal line map may affect the Fresnel term F, the normal line distribution function D, and the geometric damping term V of the BRDF.

Other Texture Parameters

Other parameters that can function as texture parameters include a specular reflection light color (specularColor) and a clear coat layer parameter indicating the presence or absence of a clear coat layer on the surface of the print medium, its thickness or transparency, and the like.

As described above, because

[1] treating the print medium on which the image is to be printed as the 3D object and

[2] taking into consideration the texture of the surface of the print medium using the texture parameters TXT, the image processing device 100 of the present embodiment can display the appearance of the print medium printed with the image on the image display section 151 with high flexibility and high reproducibility. As exemplified in FIG. 4, as viewed from the direction directly facing the print medium, the texture of the print medium surface and the sense of roughness caused by minute irregularities on the surface of the print medium appear, and as exemplified in FIG. 7, as the print medium is rotated and viewed from an oblique direction, the lighting by the light source LG is reflected glare on the surface of the print medium, and the highlighted portion HLT, which is generated as a result, appears. Note that a lighting light is not limited to lighting, such as a spotlight, directed directly at the print medium and includes sunlight, indirect lighting, and indirect light.

B. Second Embodiment

The second embodiment is an aspect as a printing system 300. The printing system 300 includes the image processing device 100 described above, an image preparing device 310, and a printing device 320. The image preparing device 310 is a computer used by the user in the present embodiment, and is a device that prepares the image data ORG which is data of the image expressed in the first color space. This image preparing device 310 may have a function of creating the image, or may simply store the image data and provide it to the image processing device 100 as necessary. The image preparing device 310 is connected to the image processing device 100 via the network NW in the same manner as the site 200 so that the image processing device 100 can acquire the image data ORG, but may be directly connected to the image processing device 100 in a wired or wireless manner.

In the present embodiment, the printing device 320 is connected to the image preparing device 310 via the network NW, receives an instruction from the image preparing device 310, and prints the image data ORG output by the image preparing device 310 on the print medium PRM. The user of the printing system 300 causes the image processing device 100 to acquire the image data ORG prior to printing by the printing device 320, handles the print medium PRM as a 3D object as described in the first embodiment, performs the lighting process using the second data SD including the texture parameters, and renders the print medium PRM including the image printed thereon.

The user confirms the rendering result on the image display section 151, and if necessary, changes the viewpoint, the position of the light source, or the strength or the white balance of the light source to confirm the appearance of the print medium PRM, and then outputs the image data ORG from the image preparing device 310 to the printing device 320 via the network NW to print the image data ORG on the print medium PRM. Prior to printing, the user can check how the image on the print medium PRM appears by physical based rendering by the image processing device 100. As a result, it is possible to print the print medium PRM after confirming the difference in texture depending on the type of the print medium PRM, including the smoothness (roughness) or the like of the surface of the print medium PRM. It is also possible to change the color of the image data ORG, change the type of the print medium PRM to be used, change the printing device 320 to be used for printing, or change an ink set thereof so as to obtain a desired printing result by viewing the rendering result displayed on the image display section 151.

When the image processing device 100 is used together with the printing device 320, a printing condition setting section 315 which sets the printing conditions that affect the appearance of the image to be printed on the print medium on the print medium to the printing device 320, may be provided in the computer which issues the printing instruction, for example, the image preparing device 310 in the present embodiment. In this way, it is possible to set a profile required for color conversion from the printing conditions, for example, such as selection of a paper tray in which predetermined print medium is stored, selection of the ink set to be used, and selection of a type of the printing device to be used, and to determine the first and second data to be referred to based on the printing conditions, and various settings can be easily realized. In addition to these conditions, the printing condition setting section 315 may set an observation state of the print medium on which the image is printed in the virtual space, the lighting information which is information about lighting for the print medium in the virtual space, an object specifying information for specifying the 3D object in the virtual space, the background information for specifying the background in the virtual space, and the like.

Figure 9:
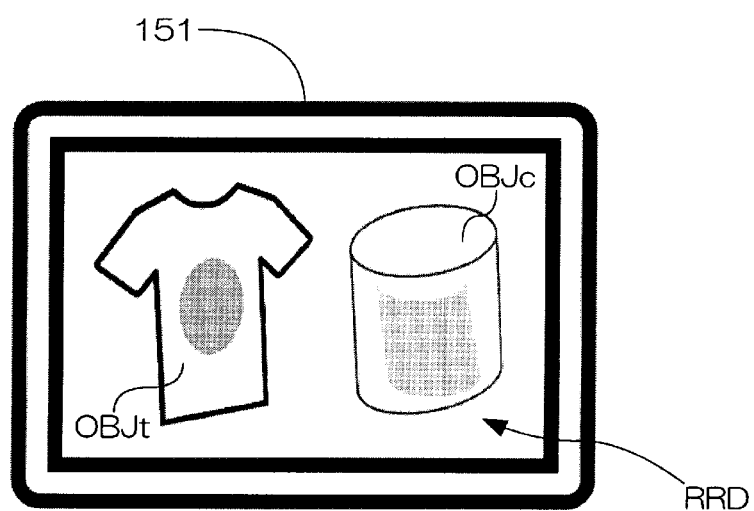
FIG. 9 is an explanatory diagram showing an example of how a print result of another print medium appears.

The print medium to be printed by the printing device 320 may be a medium other than a paper sheet. For example, the printing device may be a textile printer that performs printing on a fabric or a printing device that performs printing on a solid material such as a can or a bottle. In addition to a configuration in which printing is directly performed on the object, it is also possible to adopt a configuration of the printing device in which printing is performed on a transfer medium such as a transfer paper and ink formed on the transfer medium is transferred to the fabric or the solid material which is the print medium. As such a transfer-type printing device, there is a sublimation-type printing device. In such a transfer-type configuration, the print medium is a final printed product to which the image is transferred. In such a case, texture parameters and the like related to the structure and texture of the surface such as fabric, metal, glass, or plastic may be prepared in accordance with the properties of the print medium, and the image processing device 100 may perform physical based rendering. Also in the transfer-type printing device, the texture parameters represent the texture of the final printed product, not the transfer medium. FIG. 9 shows an example of display on the image display section 151 when printing is performed on such a fabric or can. In the figure, the object OBJt printed on a T-shirt and the object OBJc printed on the can are shown together for facilitate understanding, but normally, they are displayed one print medium at a time. Of course, a plurality of rendering execution sections may be provided, and a plurality of results of the physical based rendering may be simultaneously displayed.

C. Other Embodiments (1) The present disclosure may be implemented in the following aspects.

One of the other embodiments is an aspect of the image processing device that generates a rendering image of the print medium on which the image is printed.

This image processing device includes an image data acquisition section configured to acquire image data in which the image is expressed in a first color space; a color conversion section that uses a color conversion profile prepared in advance to convert the image data into an expression in a second color space used during rendering and to generate converted image data; a parameter acquisition section configured to acquire parameters necessary for performing physical based rendering of the print medium on which the image is to be printed as a 3D object; and a rendering execution section that uses the converted image data and the parameters to perform physical based rendering of a printed-on print medium printed with the image and to generate a rendering image corresponding to an appearance, in a virtual space, of the printed-on print medium.

In this way, it is possible to accurately reproduce the appearance of the print medium printed based on the image data. For example, how the print medium appears can be freely calculated based on various elements such as the position and angle of the light source when the print medium is viewed, the angle of the surface of the print medium with respect to the line of sight, and the texture of the surface such as the gloss of the print medium itself. Since the state of the image to be printed on the print medium is physical based rendered, the number of combinations increases as the conditions increase, and the problem of lack of flexibility does not occur. It is possible to perform reproduction including the texture of the print medium. That is, in such an image processing device, the print medium is treated as a 3D object in the virtual space, and calculation is performed on the assumption that the print data is printed on the print medium, so that the appearance of the image on the print medium can be obtained from various viewpoints and various angles. As a result, it is possible to correct the color tone and the arrangement of the image data. By showing the rendering image taking into consideration the influence and the like of the printing lighting, it is possible to suppress the occurrence of a difference in impression when the image to be printed and the print medium are combined, to reduce the repetition of trail and error by adjusting the original image or the printing conditions, and to reduce the cost and time of printing attempts.

Such an image processing device may be configured as the device for performing only the image processing described above, or may be configured as a device including the function of storing the image to be printed. Alternatively, it may be configured as a device including a function of creating the image to be printed or a device for printing the image. The image processing device may be realized by a computer provided with a GPU, or may be configured as a distributed system in which necessary functions are placed at a plurality of sites so as to cooperate with each other. When the system is configured as a distributed system, since the processing load of the terminal is reduced, it becomes easy to execute the image process even in a portable terminal such as the tablet, and the convenience of the user is further improved.

Various existing configurations can be adopted for such a rendering execution section. In general, rendering may be performed by dividing it into a plurality of elements such as viewpoint conversion for converting three dimensional world coordinates into a coordinate system viewed from the viewpoint, culling for removing vertex unnecessary for rendering from the 3D object, clipping for removing invisible coordinates, and rasterization. These processes configured to be suitable for the process in the dedicated GPU, and may be realized by the pipeline configuration including the vertex pipeline that performs the process related to the vertex of the 3D object and the pixel pipeline that performs the process related to each rasterized pixel.

(2) Such a configuration may be such that the parameters include first data relating to a shape of the print medium under a light source in the virtual space and second data relating to image formation on a surface of the print medium and the rendering execution section is configured to calculate the shape under the light source of the print medium as the 3D object in the virtual space using the first data and to perform the physical based rendering of the printed-on print medium by using the second data to map the converted image data onto the surface of the print medium having the shape.

In this way, the parameters can be handled separately as the first data and the second data.

(3) The configuration of the above (1) and (2) may be such that in the second data, a first type of print medium classified as having a use frequency equal to or higher than a predefined use frequency is stored in advance in a storage section provided in the image processing device, and a second type of print medium having a lower use frequency than the first type of print medium is acquired from the outside of the image processing device at the time of use.

In this way, since the frequently used second data is stored in the internal storage section of the image processing device, it is not necessary to acquire the frequently used second data from the outside each time. Since that is low-frequently used is acquired from the outside at the time of use, it is not necessary to excessively increase the capacity of the internal storage section. Note that most or all of the second data may be stored in the storage section in advance, or most or all of the second data may be acquired from the outside each time. The mode of acquiring from the outside includes a mode in which the user inputs the parameters using the terminal, and a mode in which the second data is encoded in the form of a two dimensional bar code or the like and is read using a camera or the like. The first data may be handled in the same manner.

(4) The configuration of the above (1) to (3) may be such that the rendering execution section includes a vertex shader configured to process, in the virtual space, vertex information of a vertex existing on the surface of the print medium, a rasterizer configured to convert the vertex information of the print medium processed by the vertex shader into pixel unit information when expressing the print medium, and a pixel shader configured to perform at least a lighting process in the virtual space by using the vertex information in the pixel unit.

Thus, it is easy to optimize the process of the GPU or the like.

(5) The configuration of the above (1) to (4) may be such that the first data includes normal line data of the surface of the print medium, lighting information for lighting the print medium under the light source, and camera information for capturing an mage of the print medium under the light source and the vertex shader is configured to perform at least coordinate conversion, shading, and calculation of texture coordinates using the normal line data, the lighting information, and the camera information.

In this way, the configuration of the process can be made clear. Note that the vertex shader may also perform process other than these, and may leave any of the process to another processing section.

(6) The configuration of the above (1) to (5) may be such that the second data includes texture parameters representing a texture of the surface of the print medium and the pixel shader is configured to perform the lighting process in accordance with a predefined lighting model using the converted image data, the vertex information, and the texture parameters.

In this way, it is possible to execute rendering in consideration of the texture of the surface of the print medium, and to accurately calculate the appearance of the print medium on which the image is printed. The texture parameters representing such texture include metallic, normal line map (Normal Map), specular reflection light color (specularColor), the clear coat layer parameter, and the like, in addition to smoothness or roughness of the surface of the print medium. It is not necessary to use all of these as the texture parameters, and desired parameters may be selected and used.

(7) The configuration of the above (1) to (6) may further include a display section configured to display the rendering image.

In this way, the user can immediately confirm the rendering result using the display section. When a tablet or the like is used as the display section, the user can work remote from the image processing device or the printing device that performs printing.

(8) The configuration of the above (1) to (7) may be such that the color conversion profile includes at least one of an input profile, which is a conversion profile from the first color space to a device independent color space, a common color space profile, which is a conversion profile to a common color space such as sRGB, and a medium profile of the print medium.

In this way, the conversion can be facilitated by using a desired profile. When the medium profile of the print medium is used, conversion from the device-independent color space to the device-dependent color space and conversion from the device-dependent color space to the device-independent color space may be performed. In this way, it is possible to reflect the device-dependent color space and convert into the expression in the second color space used at the time of rendering. If the device-dependent color space is narrower than the device-independent color space, it is possible to perform the rendering process including the limitation of the color value occurring at the time of actual printing, and it is possible to more closely approximate the actual appearance. Of course, the device-dependent color space may be wider.

(9) The configuration of the above (1) to (8) may further include a printing condition setting section configured to set, in a printing device for printing the image, printing conditions affecting the appearance on the print medium of the image printed on the print medium.

In this way, it is possible to set a profile required for color conversion from the printing conditions, for example, such as selection of a paper tray in which predetermined print medium is stored, selection of the ink set to be used, and selection of a type of the printing device to be used, and to determine the first and second data to be referred to based on the printing conditions, and various settings can be easily realized.

(10) The configuration of the above (1) to (9) may be such that the parameter acquisition section is configured to acquire, as one of the parameters, at least one of an observation state of the print medium printed with the image in the virtual space, lighting information which is information about lighting for the print medium in the virtual space, object specifying information for specifying the 3D object in the virtual space, and background information for specifying a background in the virtual space. In this way, the appearance of the print medium can be obtained according to various printing conditions.

(11) The configuration of the above (1) to (10) may be such that the parameter acquisition section is configured to acquire, as one of the parameters, background information specifying a background in the virtual space that is background information including information about lighting and the lighting process includes a lighting process of the print medium using the information about lighting included in the background information.

In this way, the physical based rendering can be performed including the background, and the appearance of the print medium can be calculated more precisely.

(12) The configuration of the above (1) to (11) may be such that the information about lighting of the background information includes global lighting information which is information about light for the entire virtual space.

In this way, the physical based rendering can be performed including the influence of global lighting, and the appearance of the print medium can be calculated more precisely.

(13) As another embodiment of the present disclosure, a configuration as a printing system is possible.

This printing system includes an image data preparation device configured to prepare image data, which is data of an image expressed in a first color space; the image processing device according to (1) to (12) configured to acquire the image data prepared by the image data preparation device and to perform image processing; a display section configured to display the rendering image generated by the image processing device; and a printing device configured to print the image data.

In this way, since the appearance of the print medium printed with the image is displayed on the display section prior to the printing when the printing is performed by the printing device, the printing can be performed after confirming this. Therefore, it is possible to suppress the occurrence of a difference between the image to be printed and the impression of the print medium, to reduce the repetition of the trial and error by adjusting the original image or the printing conditions, and to reduce the cost and time while attempting to print.

(14) Another configuration of the present disclosure is a configuration as the image processing program.

This image processing program for generating a rendering image of a print medium printed with an image, the image processing program including a first function of using a color conversion profile prepared in advance to convert image data, which is data of an image expressed in a first color space, into an expression in a second color space used during rendering and generating a converted image data and a second function of using the converted image data and parameters necessary for performing physical based rendering of the print medium on which the image is to be printed as a 3D object, to perform physical based rendering of the printed-on print medium printed with the image to generate a rendering image corresponding to an appearance, in the virtual space, of the printed-on print medium.

In this way, the image processing device described as (1) can be easily configured in the device provided with the computer.

(15) In each of the above described embodiments, a part of the configuration realized by hardware may be replaced by software. Alternatively, at least a part of the configuration realized by software may be realized as a hardware configuration, for example, by a discrete circuit configuration. In a case where some or all of the functions of the present disclosure are realized by software, the software (computer program) can be provided in a form stored in a computer-readable recording medium. The "computer-readable recording medium" is not limited to a portable recording medium such as a flexible disk or a CD-ROM, and also includes an internal storage device in a computer such as various RAMS or ROMs, or an external storage device fixed to a computer such as a hard disk. That is, the "computer-readable recording medium" has a broad meaning including an arbitrary recording medium capable of fixing a data packet not temporarily.

The present disclosure is not limited to the above described embodiments, and can be realized by various configurations without departing from the scope of the present disclosure. For example, the technical features in the embodiments corresponding to the technical features in the aspects described in the summary of the disclosure can be appropriately replaced or combined in order to solve a part or all of the problems described above or in order to achieve a part or all of the effects described above. If a technical feature is not described as an essential feature in the present specification, the technical feature can be deleted as appropriate.

What is claimed is:

1. An image processing device for generating a rendering image of a print medium and an image printed on the print medium, the image processing device comprising:
    a processor configured to acquire image data in which the image is expressed in a first color space,
    the processor being configured to use a color conversion profile prepared in advance to convert the image data into an expression in a second color space used during rendering and to generate converted image data,
    the processor being configured to acquire parameters necessary for performing physical based rendering of the print medium, on which the image is to be printed, as a 3D object,
    the processor being configured to use the converted image data and the parameters to perform physical based rendering of the print medium and the image printed on the print medium and to generate a rendering image corresponding to an appearance, in a virtual space, of the print medium and the image printed on the print medium,
    the parameters including first data relating to a shape of the print medium under a light source in the virtual space and second data relating to image formation on a surface of the print medium, and
    the second data including texture parameters representing a texture of the surface of the print medium, the texture parameters including a normal line map that stores a plurality of normal line vectors in association with a plurality of irregularities on the surface of the print medium and a clear coat layer parameter indicating presence or absence, thickness or transparency of a clear coat layer forming the surface of the print medium.

2. The image processing device according to claim 1, wherein
    the processor is configured to calculate the shape of the print medium as the 3D object under the light source in the virtual space by using the first data and to perform the physical based rendering of the print medium and the image printed on the print medium by using the second data to map the converted image data onto the surface of the print medium having the shape.

3. The image processing device according to claim 2, wherein
    in the second data, a first type of print medium classified as having a use frequency equal to or higher than a predefined use frequency is stored in advance in a storage section provided in the image processing device, and a second type of print medium having a lower use frequency than the first type of print medium is acquired from outside the image processing device at the time of use.

4. The image processing device according to claim 2, wherein
    the processor includes a vertex shader configured to process, in the virtual space, vertex information of a vertex existing on the surface of the print medium, a rasterizer configured to convert the vertex information of the print medium processed by the vertex shader into pixel unit information when expressing the print medium, and a pixel shader configured to perform at least a lighting process in the virtual space by using the vertex information in the pixel unit.

5. The image processing device according to claim 4, wherein
    the first data includes normal line data of the surface of the print medium, lighting information for lighting the print medium under the light source, and camera information for capturing an image of the print medium under the light source and
    the vertex shader is configured to perform at least coordinate conversion, shading, and calculation of texture coordinates using the normal line data, the lighting information, and the camera information.

6. The image processing device according to claim 4, wherein
the pixel shader is configured to perform the lighting process in accordance with a predefined lighting model using the converted image data, the vertex information, and the texture parameters.

7. The image processing device according to claim 4, wherein
the processor is configured to acquire, as one of the parameters, background information specifying a background in the virtual space that is background information including information about lighting and
the lighting process includes a lighting process of the print medium using the information about lighting included in the background information.

8. The image processing device according to claim 7, wherein
the information about lighting of the background information includes global lighting information which is information about light for the entire virtual space.

9. The image processing device according to claim 1, further comprising:
a display section configured to display the rendering image.

10. The image processing device according to claim 1, wherein
the color conversion profile includes at least one of an input profile, which is a conversion profile from the first color space to a device independent color space, a common color space profile, which is a conversion profile to a common color space, and a medium profile of the print medium.

11. The image processing device according to claim 1, wherein
the processor is configured to set, in a printing device for printing the image, printing conditions affecting the appearance on the print medium of the image printed on the print medium.

12. The image processing device according to claim 1, wherein
the processor is configured to acquire, as one of the parameters, at least one of an observation state of the print medium and the image printed on the print medium in the virtual space, lighting information which is information about lighting for the print medium in the virtual space, object specifying information for specifying the 3D object in the virtual space, and background information for specifying a background in the virtual space.

13. A printing system comprising:
an image data preparation device configured to prepare image data, which is data of an image expressed in a first color space;
the image processing device according to claim 1 configured to acquire the image data prepared by the image data preparation device and to perform image processing;
a display section configured to display the rendering image generated by the image processing device; and
a printing device configured to print the image data.

14. A non-transitory computer-readable storage medium storing an image processing program implemented by a computer to generate a rendering image of a print medium and an image printed on the print medium, the image processing program comprising:
a first function of using a color conversion profile prepared in advance to convert image data, which is data of an image expressed in a first color space, into an expression in a second color space used during rendering and generating a converted image data; and
a second function of using the converted image data and parameters necessary for performing physical based rendering of the print medium, on which the image is to be printed, as a 3D object, to perform physical based rendering of the print medium and the image printed on the print medium and to generate a rendering image corresponding to an appearance, in the virtual space, of the print medium and the image printed on the print medium,
the parameters including first data relating to a shape of the print medium under a light source in the virtual space and second data relating to image formation on a surface of the print medium, and
the second data including texture parameters representing a texture of the surface of the print medium, the texture parameters including a normal line map that stores a plurality of normal line vectors in association with a plurality of irregularities on the surface of the print medium and a clear coat layer parameter indicating presence or absence, thickness or transparency of a clear coat layer forming the surface of the print medium.

* * * * *